United States Patent [19]

Safford

[11] Patent Number: 4,738,600

[45] Date of Patent: Apr. 19, 1988

[54] LUBRICATING SYSTEM

[75] Inventor: George J. Safford, Orchard Park, N.Y.

[73] Assignee: Dresser-Rand Company, Corning, N.Y.

[21] Appl. No.: 22,038

[22] Filed: Mar. 5, 1987

[51] Int. Cl.⁴ ............................ F04B 9/10; F16N 13/16
[52] U.S. Cl. .................................... 417/403; 184/6.16; 184/29
[58] Field of Search ............... 417/401, 402, 403, 404, 417/382; 184/29, 6.16; 418/88

[56] References Cited

U.S. PATENT DOCUMENTS

| | | | |
|---|---|---|---|
| 2,057,364 | 10/1936 | Bystricky | 417/403 |
| 2,070,574 | 2/1937 | Bijur | 184/29 |
| 2,170,228 | 8/1939 | Aikman | 184/29 |
| 2,258,493 | 10/1941 | Hull | 184/29 |
| 3,174,409 | 3/1965 | Hill | 417/403 |
| 3,180,527 | 4/1965 | Wasilewski et al. | 417/403 |
| 3,737,254 | 6/1973 | Swatty | 417/403 |
| 4,028,014 | 6/1977 | Cocks | 417/403 |
| 4,233,000 | 11/1980 | Cox | 417/402 |
| 4,262,775 | 4/1981 | Webb | 184/6.16 |
| 4,302,159 | 11/1981 | Barry | 417/403 |
| 4,405,292 | 9/1983 | Bixby, Jr. et al. | 417/403 |
| 4,436,494 | 3/1984 | Yamaizumi | 417/403 |

Primary Examiner—Leonard E. Smith
Assistant Examiner—Leonard P. Walnoha

[57] ABSTRACT

A lubrication system for a mechanism including a differential pump for pumping lubricant into the mechanism powered by the flow of a first lubricant from a parallel lubrication system within the mechanism.

12 Claims, 2 Drawing Sheets

LUBRICATING SYSTEM

TECHNICAL FIELD

This invention relates to lubricating systems and in particular to a lubricating system including a fluid driven pump for delivering a predetermined flow of lubricant in a high-pressure compressor or related mechanism.

BACKGROUND OF THE INVENTION

As is well known in the art, in a typical recriprocating high-pressure compressor, lubrication fluid is continually injected into the compressor bearings and the various seals in the compression chamber of the compressor. Typically, the lubricant is injected into the bearings at a pressure in a range of about 25 to 50 psi, and into the seals at a pressure at least as high as the pressure of the gas in the compression chamber which generally is in excess of 1000 psi.

In order to maintain complete lubrication of the bearings and seals under these diverse pressure conditions, it has been the practice to provide a separate bearing oil pump in the compressor which is adapted to pump a continuous flow of oil from the crankcase of the compressor into the bearings, and a second high-pressure pump which is adapted to inject oil into the seals. In general a high-pressure reciprocating pump has been used to inject the oil into the seals since reciprocating pumps have the inherent advantage of pumping the same known quantity of fluid during each operating cycle. Thus, the pumping rate of such pumps can be controlled with considerable accuracy by controlling the frequency at which the pumping cycle is repeated. Accordingly, both electronically and mechanically operated reciprocating pumps have been used for this purpose.

In electronically controlled pumps, a suitable switching circuit is generally used to control the frequency of the pumping cycle, and in the various mechanically controlled pumps, a series of cams, sprockets, and chains are usually coupled to the drive shaft of the compressor to control the pumping cycle. By way of illustration, U.S. Pat. No. 4,028,014 shows a double-acting piston type fluid pump which is cyclically reversed by solenoid valves actuated by electrical switches located at each end of the piston stroke, and U.S. Pat. No. 3,180,527 shows a double-acting pump which is cyclically reversed by a reversing valve actuated by a mechanical camming arrangement connected to a rotating output shaft on a timer.

While electrically controlled pumps have proven satisfactory in many applications, there are a number of cases where the use of electrical power is inappropriate or the power is simply not available. In those applications, is has been the practice to use one of the various mechanical cam and sprocket arrangements to control the pump. However, in many of those applications, the operating environment of the pump and the relative complexity of the cam and sprocket arrangement result in frequent breakdowns and downtime while the pump is being repaired.

SUMMARY OF THE INVENTION

The present invention relates to lubricating systems and in particular to a lubricating system for a mechanism incuding a differential pump for pumping a second flow of lubricant into the mechanism powered by the flow of lubricant from a parallel lubricating system within the mechanism.

The invention provides for connecting the oscillating drive of the differential pump to the fluid supply pump of the parallel lubrication system in a fashion diverting a portion of that flow through the oscillating drive and then returning it to the parallel system. The oscillating drive, which reciprocabily drives a pumping piston within a cylinder provided within the differential pump to pump the second flow of lubricant into the mechanism, is sized to maintain a predetermined pressure in the second lubricant flow. Additionally, an adjustable flow regulating valve is connected between the parallel system and the inlet of the oscillating drive to enable a workman to adjust the flow rate from the fluid supply pump. This enables a workman to adjust the second lubricant flow rate while also providing an arrangement for maintaining the second flow at a relatively constant rate under varying pressure and temperature conditions in the lubricant as it leaves the fluid supply pump. The invention also calls for immersing the cylinder of the differential pump within a lubricant reservoir provided for the lubricant being conveyed by the pump. This has been found to assure complete lubrication of the pump while at the same time essentially eliminating cavitation within the second lubricant flow.

Considering the foregoing, it can be seen that the invention contemplates a relatively inexpensive and reliable lubrication system which is particularly adapted for installation and use on existing as well as original equipment. However, it is to be understood that various changes can be made in the arrangement, form and construction of the apparatus disclosed herein without departing from the spirit and scope of the invention.

DESCRIPTION OF THE PREFERRED EMBODIMENT

Figure 1:
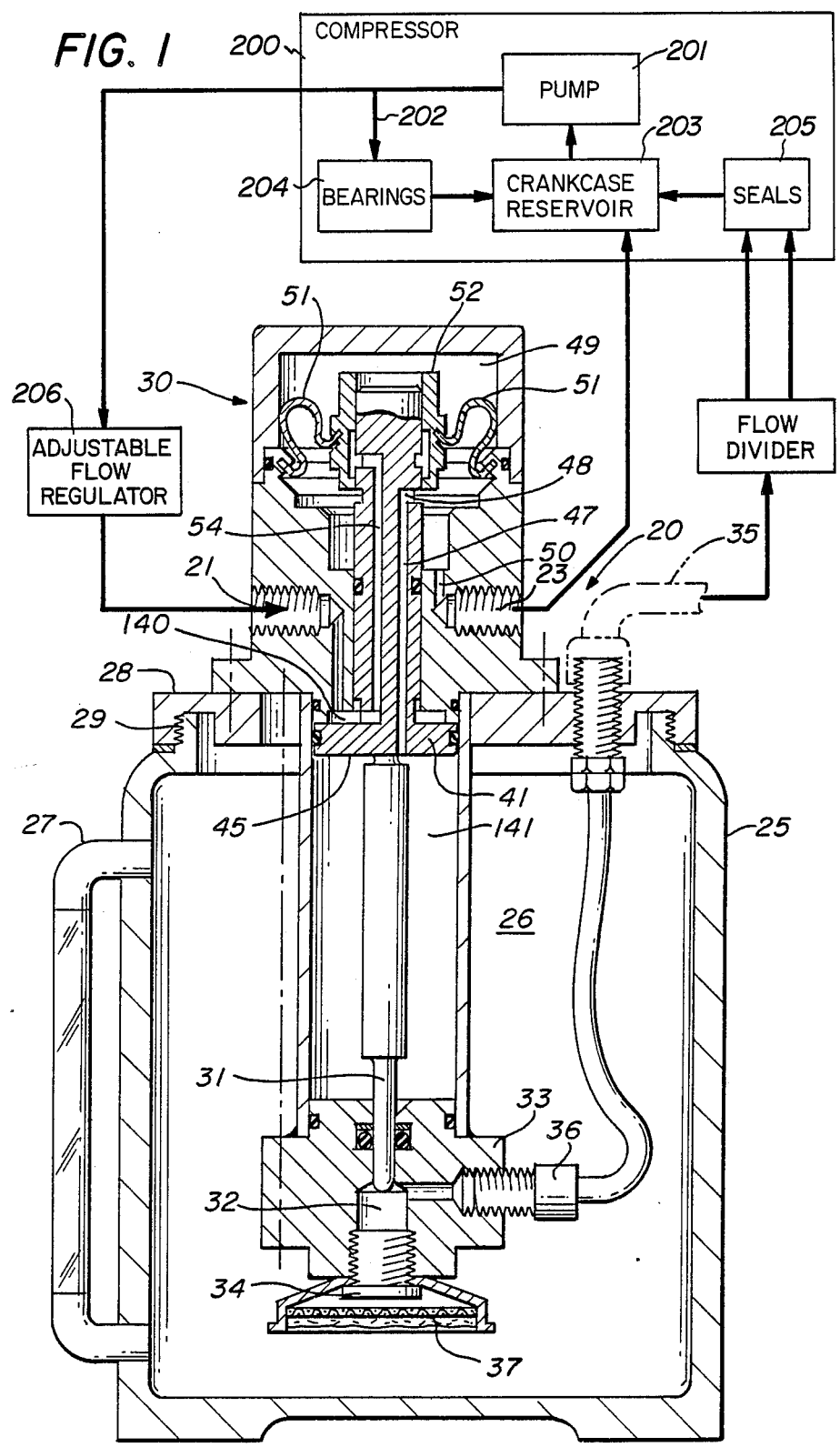
FIG. 1 is a cross-sectional view of the differential pump in the lubricating system.

The high-pressure lubricating system embodying the invention is connected to a conventional reciprocating high-pressure compressor. A typical application of the invention is shown schematically in FIG. 1. The compressor, 200 which is particularly suited for use in oil fields and related applications in relatively remote locations, is adapted to compress air or other gases to pressures in the range of 1000 to 2000 psi.

The compressor is provided with a piston which is reciprocably driven within a compression chamber by a connecting rod or other suitable drive in the conventional fashion, a bearing oil pump 201 which is adapted to inject a continuous flow 202 of bearing oil into the bearing housing 204 through a first lubrication point, a crankcase forming a reservoir 203 for the bearing oil, and a plurality of seals 205 within the compression chamber which are lubricated by the high-pressure lubrication system through second lubrication points. As in the conventional compressor of this type, the bearing oil injected into the bearing housing is in turn collected in the crankcase and recirculated back to the bearing pump and again injected into the bearing housing. The invention utilizes this continuous flow to power the high-pressure lubrication system as will be described.

FIG. 1 shows the lubrication system including a differential pump 20 having an inlet 21 connected to the bearing pump through an adjustable flow regulating valve 206, and an outlet 23 connected to the crankcase through a conduit. The differential pump 20 is mounted on an apertured cover 28 which is removably secured via threading 29 onto the open top of a container 25 forming a reservoir 26 for the lubrication system. A sight gauge formed of a graduated glass tube 27 is mounted on the side of the container 25 for indicating the level of lubricant in the reservoir 26. This arrangement enables a workman to easily monitor the level of lubrication fluid in the reservoir and periodically replenish it during operation of the compressor.

The differential pump 20 is provided with an oscillating drive 30 which is connected to a high-pressure piston 31 reciprocably mounted within a high-pressure cylinder chamber 32 formed in a cylinder body 33 at the base of the pump, it being noted that the cylinder body 33 is sealed and protectively enclosed within the container 25. The cylinder chamber 32 opens into the reservoir 26 through a flow-through filter screen 37 and an inlet check valve 34 mounted on the cylinder body 33. This accommodates one-way flow of filtered lubrication fluid from the reservoir 26 into the cylinder chamber 32. Similarly, a check valve 36 is mounted on the cylinder body 33 which accommodates one-way flow of lubricant from the cylinder chamber 32 to the seals through a conduit 35 connected to the lubrication points. Thus, as will be readily appreciated, upon reciprocation of the high-pressure piston 31, lubricant is drawn from the reservoir 26 and pumped to the seals through the conduit 35.

As noted above, the differential pump 20 is powered by the continuous flow of oil from the bearing oil pump. In the embodiment shown, the bearing oil is conducted through the oscillating drive 30 to reciprocate the high-pressure piston 31 in direct proportion to the volumetric flow rate of the oil flowing into the pump. Although the various details and the particular structure of the oscillating drive 30 are not claimed as a part of the invention, the oscillator shown in the drawings is similar to that shown in the reciprocating hydraulic pressure converter disclosed in U.S. Pat. No. 3,737,254. However, while that patent discloses a hydraulic oscillator suitable for use in the lubrication system, it is to be understood that any one of a variety of commercially available hydraulic oscillators can be used for this purpose, provided the oscillating rates of those oscillators are proportional to the flow rate of the fluid being circulated through them.

FIGS. 2-5 illustrate a typical pumping cycle of the oscillating drive during operation of the pump. In operation, a constant flow of bearing oil is admitted to the inlet 21. This flow initially passes into the upper portion of the cylinder chamber 140 on the top of the differential piston. As shown in the drawings, each of the surface areas 44 and 45 of the differential piston 41 are substantially greater than the cross sectional area of the high-pressure piston 31. Generally, the surface areas 44 and 45 of the differential piston are in a range of 50–100 times the area of the high-pressure piston. This arrangement serves to amplify the pressure of the bearing oil in direct proportion to the ratio of the areas in the piston. For example, where the pressure of the bearing oil at the inlet 21 is 20 psi, the pressure of the lubricant as it is pumped from the high-pressure chamber 32 can be as high as 2000 psi, depending on the ratio of the areas of the pistons.

Figure 2:
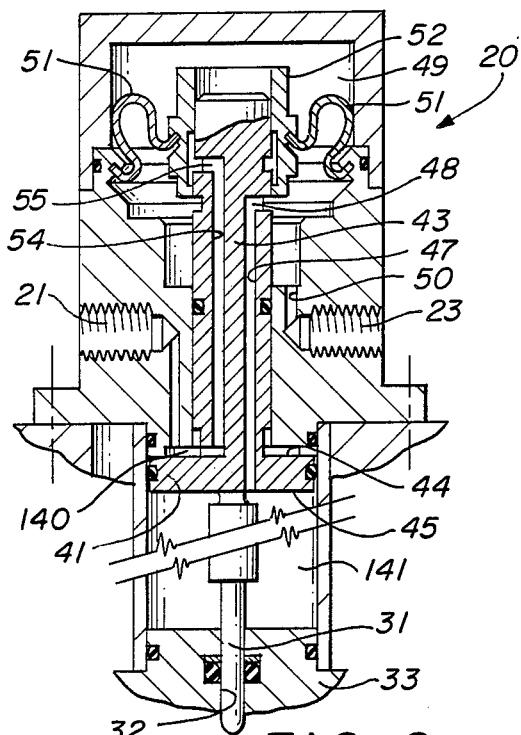
FIGS. 2-5 illustrate the pumping cycle of the differential pump.
Figure 3:
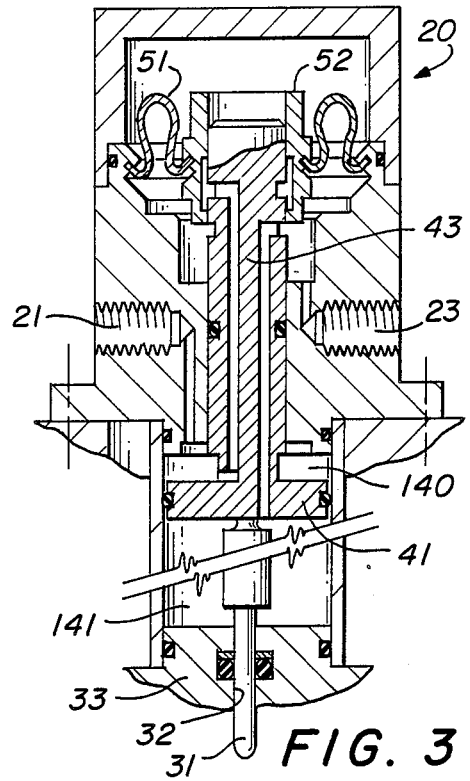
Figure 4:
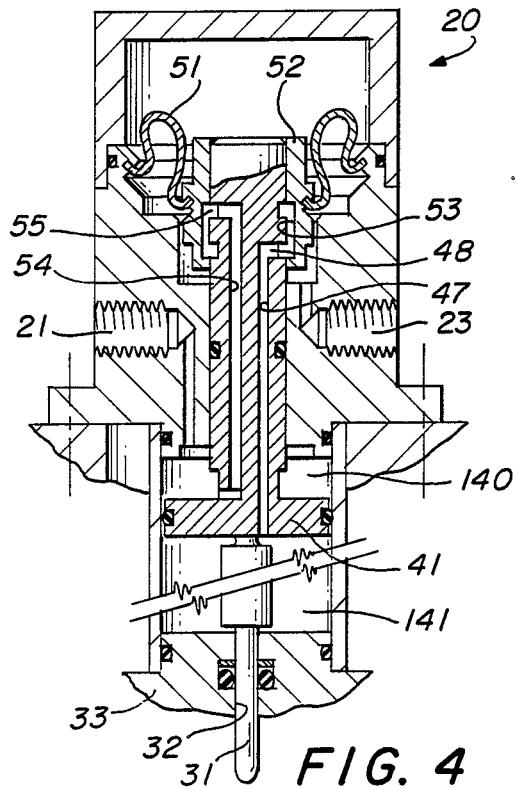
Figure 5:
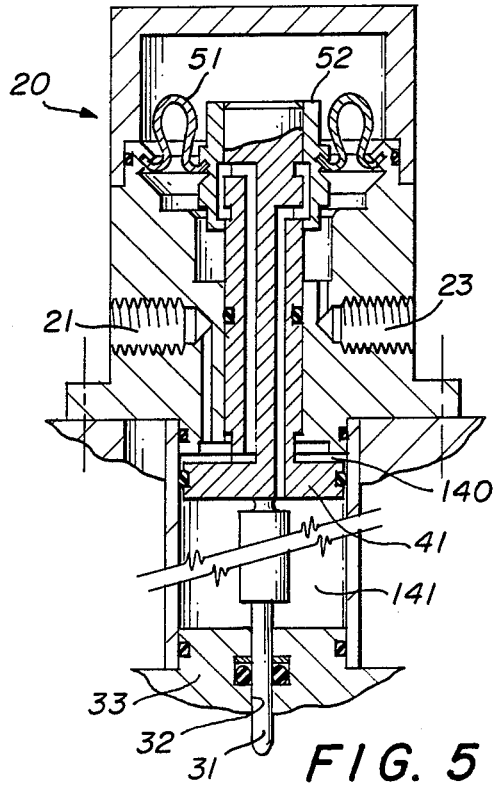

Referring to FIG. 2, at the start of the pumping cycle, the portion of the cylinder chamber 141 on the bottom of the differential piston 41 is vented through a duct 47 and port 48 into a valving cavity 49 from which it is discharged through a duct 50 and the outlet 23 into the crankcase. As the cycle continues, the differential piston 41 is driven downward as illustrated in FIG. 3. This drives the high-pressure piston 31 downward to pump the lubricant in the cylinder chamber 32 through the outlet check valve 36 into the conduit 35. This pumping action continues until the differential piston is driven down far enough to actuate a plurality of symmetrical spaced over-center springs 51 which in turn cause an annular sleeve 52 on the valving stem 43 to snap down relative to the valving stem into the position shown in FIG. 4. After the sleeve 52 has been snapped into its lower position by the springs 51, an annular groove 53 in the sleeve 52 interconnects the duct 47 with a duct 54 via ports 48 and 55 so the portion of the cylinder chamber 141 on the bottom side of the differential piston 41 is connected to the inlet 21. This in turn results in the oil flowing into the cylinder chamber to drive the differential piston 41 upward as shown in FIG. 5 until the springs 51 snap the sleeve 52 back to the original position shown in FIG. 2, whereafter the cycle continues to repeat itself.

From the foregoing, it can be seen that the flow of lubricant from the reservoir 26 can be easily adjusted by varying the flow rate of the bearing oil into the oscillating drive 30. This, of course, means that any variations in the oil flow at the inlet 21 can significantly affect the flow rate of the lubrication fluid into the seals. Therefore, in order to assure a constant flow into the seals at a variety of different operating temperatures as well as to adjust the flow rate for the various operating conditions of the compressor, the invention utilizes the flow regulating valve to essentially assure that the desired flow rate is maintained in the bearing oil flowing into the pump 20. In a prototype of the lubricating system, a flow regulating valve offered by Bijur Lubricating Corporation of Bennington, Vt. under the model designation of V3 Lubricator was found suitable for this purpose. This particular valve was found to maintain a constant flow of bearing oil at temperatures ranging from about 50°–150° F. with the unit viscosity of the oil in a range of about 500–10,000 saybolt second units.

In addition to the above, the invention also contemplates dividing up the flow of lubricant from the high-pressure cylinder chamber 32 between three or more of the seals in the compressor chamber. This is accomplished by connecting a conventional flow divider or splitter block to the conduit to meter the flow to each of the seals. While the particular splitter block selected depends on the lubrication requirements for each of the seals, in the prototype noted above a splitter block manufactured by the Bijur Lubricating Corporation under the model designation of ZPA Splitter was used to divide an output flow of 45 drops per minute into equal flows of 15 drops per minute to each of the seals.

Considering the foregoing, it can be seen that the invention contemplates a high-pressure lubricating system for high-pressure air compressors which for the most part eliminates the problems with mechanical breakdowns which have typically been encountered with the mechanical lubricating systems heretofore in use. Moreover, the lubricating system is particularly adapted for use on existing equipment without significant modification since it uses the existing bearing oil supply pump to power the differential pump. Thus, in addition to being relatively inexpensive and easy to install and maintain, the system is of a relatively straight-forward and reliable design. Additionally, by encasing the cylinder body of the pump within the reservoir so that its inlet is immersed in the lubrication fluid to be injected into the seals, the invention provides a self-priming pump which eliminates cavitation within the pump as well as pressure losses which could otherwise result from friction in the feedlines to the pump and the like.

I claim:

1. In a compressor having first and second lubrication points adapted to receive first and second lubrication fluids during operation of the compressor, first fluid supply means adapted to deliver a continuous flow of the first lubrication fluid to the first lubrication point, and a first fluid reservoir connected to collect fluid from the first lubrication point and recirculate it back to the first fluid supply means, the improvement comprising a lubricating system for supplying a selective flow of the second lubrication fluid to the second lubrication point, including:

adjustable flow regulating means connected to the first fluid supply means adapted to deliver a preselected constant flow of the first lubrication fluid over a preestablished range of pressures and temperatures in said first fluid;

a second fluid reservoir for the second lubrication fluid; and a differential pump connected in flow-through communication between said flow regulating means and the first fluid reservoir including oscillating drive means driven by the first lubrication fluid as it flows through the pump, a cylinder body defining a cylinder chamber, an inlet check valve connected with the body and said second fluid reservoir accommodating one-way flow of the second lubrication fluid from the second fluid reservoir into the cylinder chamber, an outlet check valve connected with the body and the second lubrication point accommodating one-way flow of the second lubrication fluid from the cylinder chamber to the second lubrication point, and a piston mounted within the cylinder chamber connected to said oscillating drive means adapted to be reciprocably driven within the cylinder chamber by said oscillating drive means at a rate in proportion to the flow of the first lubrication fluid from said flow regulating means to pump the second lubrication fluid from said second reservoir to the second lubrication point at a selected flow rate.

2. The lubricating system in the compressor of claim 1 wherein the compressor includes a plurality of second lubricating points, and flow divider means connected between said outlet check valve and the second lubrication points for maintaining a predetermined flow of the second lubrication fluid to each of the second lubrication points.

3. The lubricating system in the compressor of claim 1 wherein the compressor includes a compression chamber and a fluid seal within the compression chamber connected with the second lubrication point, and said differential pump means being adapted to deliver the second lubrication fluid to the second lubrication point at a pressure at least as great as the pressure of the gases within the compression chamber.

4. The lubricating system in the compressor of claim 1 wherein the compressor includes a bearing oil supply pump forming said first fluid supply means adapted to deliver bearing lubricating oil as the first lubrication fluid, and said differential pump being adapted to deliver the second lubrication fluid to the second lubrication point at a pressure greater than the pressure of the bearing lubricating oil.

5. The lubricating system in the compressor of claim 1, and said differential pump being adapted to deliver the second lubrication fluid to the second lubrication point at a preselected pressure in the range of about 50-100 times the pressure of the first lubrication fluid.

6. The lubricating system in the compressor of claim 1, and said flow regulating means being adapted to deliver a relatively constant flow of the first lubrication fluid with the viscosity of said first fluid being in a range of about 500 to 10,000 saybolt second units.

7. The lubricating system in the compressor of claim 1, and said cylinder body being enclosed within said second fluid reservoir.

8. The lubricating system in the compressor of claim 1, and filter means connected in flow-through relation between said second fluid reservoir and said inlet check valve.

9. The lubricating system in the compressor of claim 1, and gauge means connected with said second fluid reservoir for indicating the quantity of said second fluid in the second fluid reservoir.

10. The lubricating system in the compressor of claim 1, and said fluid reservoir including an open top container and an apertured cover releasably secured across the top of the container to enclose the reservoir; and said differential pump being mounted on said cover with said cylinder body depending through the aperture in the cover into the interior of the container.

11. The lubrication system in the compressor of claim 1 wherein the compressor is a reciprocating compressor.

12. In a mechanism having first and second lubrication points adapted to receive relatively continuous flows of first and second lubrication fluids at different pressures during operation of the mechanism, a first fluid reservoir, and first fluid supply means adapted to deliver a continuous flow of the first lubrication fluid to the first lubrication point, the improvement comprising a lubrication system for supplying a selective flow of the second lubrication fluid to the second lubrication point, including:

adjustable flow regulating means connected to the first fluid supply means adapted to deliver a preselected constant flow of the first lubrication fluid over a preestablished range of pressures and temperatures in said first fluid;

a second fluid reservoir for the second lubrication fluid; and a differential pump connected in flow-through communication between said flow regulating means and the first fluid reservoir including oscillating drive means driven by the first lubrication fluid as it flows through the pump, a cylinder body defining a cylinder chamber, an inlet check valve connected with the second fluid reservoir accommodating one-way flow of the second lubrication fluid from the second fluid reservoir into the cylinder chamber, an outlet check valve connected with the second lubrication point accommodating one-way flow of the second lubrication fluid from the cylinder chamber to the second lubrication point, and a piston mounted within the cylinder chamber connected to said oscillating drive means reciprocably driven within the cylinder chamber by said oscillating drive means at a rate in proportion to the flow of the first lubrication fluid from said flow regulating means to pump the second lubrication fluid from said second reservoir to the second lubrication point at a selected flow rate.

* * * * *